Dec. 3, 1946. R. E. H. CARPENTER 2,412,123
ELECTROMAGNETIC DEVICE
Filed April 23, 1943 2 Sheets-Sheet 1
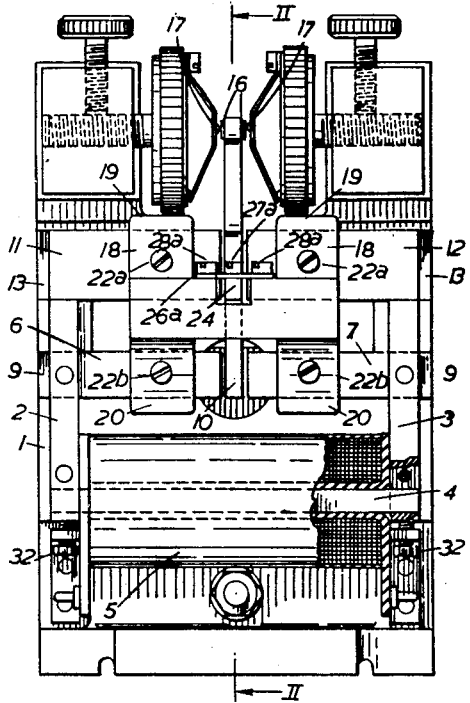
Inventor
Rupert Evan Howard Carpenter
By
Ralph B. Stewart
Attorney Dec. 3, 1946.    R. E. H. CARPENTER    2,412,123
ELECTROMAGNETIC DEVICE
Filed April 23, 1943    2 Sheets-Sheet 2

Inventor
Rupert Evan Howard Carpenter
By
Ralph B. Stewart
Attorney

Patented Dec. 3, 1946

2,412,123

UNITED STATES PATENT OFFICE 2,412,123

ELECTROMAGNETIC DEVICE

Rupert Evan Howard Carpenter, South Croydon, England

Application April 23, 1943, Serial No. 484,266
In Great Britain April 28, 1942

16 Claims. (Cl. 200—93)

This invention relates to electric telegraph relays and other electromagnetic devices having vibratory armatures, and in particular is concerned with such electromagnetic devices having a magnetic structure which comprises a part providing a magnetic circuit of low reluctance to carry the fluctuating or reversing flux, and another part which provides two magnetic paths in parallel for the steady polarising flux, and which paths have a reluctance substantially greater than that of the low reluctance magnetic circuit in which the armature oscillates and which includes the effective air gap. The invention is applicable to devices to which varying currents or potentials are applied to produce a corresponding vibratory motion of the armature, including, for example, telegraph relays and driving units of sound reproducing instruments, and also to devices in which the vibratory armature is driven to produce an electromotive force at the output terminals of the device, as is the case in electromagnetic pick-up devices for gramophones.

The present invention involves an improved construction over that shown in my U. S. Patent 1,826,990.

The object of the present invention is to provide a form of magnetic device with a magnetic structure as set out above, which is relatively efficient for a given amount of material in the magnetic structure and consequently lends itself to being housed within a small compass.

According to the present invention, the magnetic structure is arranged so that the excitation flux passes along separate paths in the structure except where they pass through the armature. Thus, the magnet or magnets which are provided to set up the excitation flux, may then be arranged so that they present polar faces to one or more faces of the vibratory armature directly, that is to say, that the magnet or part of it, such as a pole tip, is only separated from the armature by the inevitable intervening air gap. As a result, the flux passes from the magnet to the armature, or on leaving the armature, to the magnet directly or substantially directly, passing between those two members through the intervening air gap, and the magnet or magnets extend away from the corresponding face or faces of the armature.

Apart from the relatively high efficiency from the magnetic point of view, such an arrangement has definite mechanical advantages in that by mounting the magnets so that their settings relative to the armature can be varied, and indeed also the faces of members of the magnetic circuit which lead the variable flux into and out of the armature, it is possible to set the air gaps so that they all have the same lengths along the magnetic circuit. Those lengths are adjustable to the precise amount desired and the faces co-operating with the armature can be made accurately parallel with the armature faces when the armature is in its mean position. Thus, thin metal distance pieces may be inserted between the armature faces and the co-operating faces of the magnets and other members of the magnetic structure. The parts may be set up against these distance pieces, and then after clamping, the distance pieces, may be removed, leaving the air gaps accurately adjusted as desired.

It is convenient to employ two permanent magnets having like poles presented to the armature and to provide the two members of the magnetic structure which serve as pole-pieces for the fluctuating flux to face two other faces of the armature. In a form of construction in which the armature is a rectangular strip, the two permanent magnets on the other two members are arranged transversely to the length of the armature and they form four magnetic limbs parallel to one another and at right-angles to the faces of the armature with which they co-operate. Such a construction is obviously convenient and easily assembled and set in the manner mentioned above, but it cannot always be adopted because in some cases where the conditions are such that the moment of inertia of the armature of necessity should be as low as possible, it is desirable to employ an armature which in end view has the shape of a lozenge, or of a rhombus of narrow width. In that case, the four magnetic limbs referred to may be directed away substantially at right-angles from each of the four faces of such an armature from which, so to speak, they radiate, and are consequently inclined to one another. In such a case, the armature can have a cross-section which at all points along the flux path in it is roughly proportional to the flux which it has to carry, thus permitting the reduction of its mass to the amount determined by the magnetic conductance needed. Moreover, the inclined disposition of the magnetic limbs co-operating with the armature presents the advantage of allowing them to be brought very close to one another in the region of the armature without too much magnetic leakage between them occurring. Thus, the armature may be kept very short in the direction of the flux path, in fact of a length little more than that determined by the dimensions of the working or polar faces. In cases, however, in which it is desired to keep the magnetic limbs further apart, the armature may be of a section consisting of a short central portion with parallel sides and of tapering end portions. In these cases also the magnets and the pole members for the variable flux may be accurately set with respect to the armature by arranging them to slide along their axes inclined to one another, or by forming them with parts which are parallel and which can slide in parallel grooves in a base plate to and from the armature along parallel lines.

Thus, any of the forms of device referred to above may be built up on a non-magnetic base plate which is machined with shallow grooves in which the two permanent magnets and the two pole-pieces or limbs which are common to the magnetic circuit which carries the fluctuating flux, and the circuit which carries the steady polarising flux, fit slidably for assembling purposes. Then, when the parts are set truly in position by the use of shim strips or distance pieces, as already mentioned, they may be clamped in position on the base plate, for example, by means of a suitably-shaped saddle or bridgepiece which can be pressed on to the parts and held tightly in position.

It is convenient to arrange the pivots for the armature near to the centre line of the permanent magnets. The pivots may be arranged by providing the armature with lateral extensions to which a flexible blade spring may be fixed on either side, the springs being anchored to a platform on the non-magnetic base plate on the back and to the non-magnetic saddle or bridgepiece at the front. If comparatively weak springs are employed, the armature can be made side-stable but by employing sufficiently stiff springs, it may be made centre-stable, that is to say, the springs are able to return the armature to the central position when, in the case of a telegraph relay or the like, no signal or line currents are being received. The pivoting of the armature near to the centre line of the permanent magnets increases the sensitiveness of the instrument on the one hand, and on the other, the amount of movement of the armature in the neighbourhood of the magnets when moving over from one side to the other is comparatively small and does not cause much re-distribution of the field between it and the magnets, and consequently reduces hysteresis effects to a minimum. Such reduction is also helped by placing the magnets in direct relationship to the armature since, owing to the very high coercivity of the magnets themselves, very little re-distribution of flux can take place in them which would not be the case were flux paths in iron to be provided as have been heretofore in such a type of magnetic structure.

In order that the invention may be clearly understood and readily carried into effect, an example of a fully worked-out telegraph relay in accordance therewith, and some modifications of the arrangement will now be more fully described with reference to the accompanying drawings, in which—

Figure 1 is a front elevation of the relay;

Figure 2 is a central vertical section on the line II—II of Figure 1;

Figure 3 is a rear elevation of the relay; and

Figure 4 is a side elevation seen from the left of Figure 3;

Figure 6 is a diagrammatic illustration of a modification of the construction in which an armature having the shape of a rhombus of narrow width is employed; while

Figure 5:
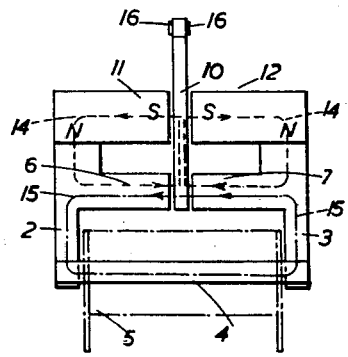
Figure 5 is a diagram to show clearly the magnetic circuits employed in Figures 1 to 4.

The telegraph relay illustrated in Figures 1 to 5 is mounted upon a base plate 1 made of non-magnetic material such as brass. On either side, upstanding from the base plate, is a pile of laminations 2, 3, made, for example, of the metal known under the trade name "Radiometal" and forming side limbs of the magnetic circuits. The bridge-piece or core 4 which carries the relay winding 5 and which may be made, for example, of the metal known under the registered trade mark "Mumetal," extends between the side limbs 2, 3 which are cut away to receive the ends of the core 4, as seen in Figures 1 and 4. The two cross-limbs 6, 7 which form parts of the magnetic circuits which carries polarising flux and fluctuating flux, also made of the material known as "Radiometal," consist of piles of laminations, the individual laminations of which form a lap joint with those of the side limbs 2, 3. A strip of Radiometal 8 is rivetted to the under surfaces of each of the cross-limbs 6, 7 and fits in a correspondingly shallow groove 9 in the base plate 1. This enables each cross-limb 6 or 7, together with the corresponding side limb 2 or 3, to slide in assembly to and from the corresponding surfaces of the armature 10. The permanent magnets 11, 12 are preferably made of a modern magnet alloy having high retentivity and coercive force, such as the magnet alloy sold under the trade name "Alnico." The magnets are disposed with their like poles towards the armature 10, as indicated by the letters NS in Figure 5, and may be magnetised in manufacture through the faces through which the flux is required to pass. The magnets butt against the upper surfaces of the side limbs 2, 3, and the cross-limb stampings 6, 7, as seen in Figures 1 and 4, and they also make a sliding fit in shallow grooves 13 in the base plate 1 so that they too during assembly can slide towards or away from the armature 10. In this way two parallel magnetic paths, shown by the dotted lines 14 in Figure 5 for the steady polarising flux of relatively high reluctance, pass from the magnets 11, 12 down into the cross-limbs 6, 7, thence pass through the armature 10 in parallel upwards, and back into the magnets 11, 12. The magnetic circuit of low reluctance for the reversals flux is shown by the chain line 15 in Figure 5, and passes from the core 4 through one of the side limbs 2, through one of the cross-limbs 6, across the armature 10 into the other cross-limb 7, and back through the side limb 3 into the core 4.

The armature 10 is generally of rectangular shape, its opposite faces being parallel to the faces of the opposite cross-limbs 6, 7, and the permanent magnets 11, 12. The armature is pivoted in the region of the mid-line of the magnets 11, 12, and is extended upwards and at the upper end bears the moving contacts 16. The side contacts or butts 17 are adjustable and are shown of the construction carried on damped compliant mountings, as set forth in patent specification No. 2,219,222.

A bridgepiece of brass 18 is provided for a double purpose, both for clamping the magnets 11 and 12 and the cross-limbs 6 and 7, and also to support the pivot at one end of the armature 10. The bridgepiece 18 engages over the upper surfaces of the magnets 11, 12 at the points 19, and also engages below the under surfaces of the lateral limbs 6, 7 at the points 20, so that it acts as a saddlepiece for the magnets and the lateral limbs. The bridgepiece 18 is secured to the base plate 1 from the back by means of screws 21. Also screws 22a and 22b are threaded in the bridgepiece 18 and their points respectively bear on the front faces of the permanent magnets 11, 12 and of the cross-limbs 6, 7. Hence, when these screws 22a, 22b are somewhat loosened, the magnets 11, 12, and the cross-limbs 6 and 7 can slide or be pushed within the shallow grooves 13, 9 to cause them to approach to or recede from the armature 10 and can then be clamped by tightening up the screws.

The pivot of the armature 10 consists of a square extension 23 towards the back and a similar extension 24 towards the front. At the back, the extension 23 passes into a recess 25 in the base plate 1, and a flexible blade spring 26 is fixed to its upper surface by a screw 27. The blade spring 26 is anchored to a platform on the base plate 1 on either side of the recess 25 by screws 28. Similarly, at the front of the bridgepiece 18 is recessed to receive the armature extension 24 which, as at the other end, is secured by a screw 27a to a thin blade spring 26a which is anchored on either side to the bridgepiece by screws 28a. Thus, when the armature is rocked, the two blade springs 26, 26a can yield sufficiently to accommodate the relatively small movement necessary, and upon any movement of the armature sideways, both blade springs are placed under tension. As already mentioned, the springs 26, 26a may allow the contacts 16 to be drawn over on either side, in which case the relay is side-stable or may be stiff enough to maintain the contacts in the central position when there is no current on the relay.

For biassing the relay, a bar magnet 29 is pivoted to the back of the base plate 1 at the point 30 and can be turned to one side or the other in a recess 31 in the base plate 1 to set the bias of the relay to neutral.

In assembling the relay, the side limbs 2, 3 with the cross-limbs 6, 7 are placed in position on the base plate 1 with the strips 8 in their grooves 9 in the base plate, the two permanent magnets 11 and 12 are placed in their grooves 13, and the bridgepiece 18 is fixed in position by the screws 21 and with the screws 22a and 22b inserted but not screwed up tightly. The armature 10 is placed in position and a shim strip, say 0.006 of an inch in thickness, is inserted between the armature on one side and the face of the magnet 11 and of the limb 6 and on the other side, between the armature and the magnet 12 and the cross-limb 7. Then, before the screws 22a, 22b are tightened up, the magnets 11, 12 and cross-limbs 6, 7 are pressed in against the shims which ensures first of all that the armature 10 is set square to the magnets and lateral limbs, and also that the two magnets and the two pole-pieces are equally distantly spaced from the opposite faces of the armature 10. At that stage, the two screws 22a, 22b can be tightened to clamp the magnets 11, 12 and the limbs 6, 7 in position, and also two screws 32 threaded in right-angle brackets 33 rivetted to the base plate 1 are screwed in so as to bear against the core 4 and hold it in position. Finally, the screws 27 and 27a which had been loosened to prevent distortion during the assembly, are tightened up. With all the parts thus finally tightened up, the shims can be withdrawn.

Figure 6:
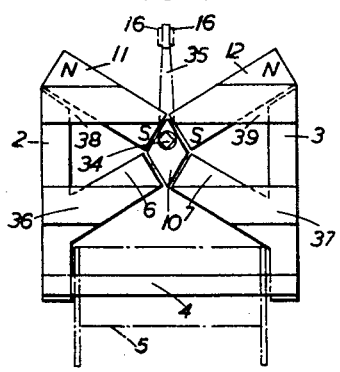

In the form of construction shown diagrammatically in Figure 6, the armature 10, instead of being rectangular, has now the shape of a narrow rhombus, as seen in end view. Its moment of inertia can, therefore, be made small relatively to its magnetic conductivity and it can be pivoted about the centre of gravity of the system comprising the armature 10 and the contact tongue 35, for example, by means of a square spindle 34 furnished with suitable bearings or suspensions. The tongue 35 carrying the movable contacts 16 is also fixed to the spindle 34.

The magnetic circuit of the device is similar to that shown in Figures 1 to 5 except that the two permanent magnets 11, 12 are not parallel to one another but are set substantially at right-angles to the upper faces of the armature 10, and the two cross-limbs 6, 7 are similarly set with their centre lines at right-angles to the two lower faces of the armature 10. For assembling purposes, the magnets 11, 12 and the cross-limbs 6, 7 may be caused to fit in inclined shallow grooves in a base plate similar to the plate 1 in Figures 1 to 4, but as illustrated diagrammatically, the cross-limbs 6, 7 are made in one with the side limbs 2, 3 and each of these composite units has a brass strip 36, 37 fixed to its rear face and arranged to slide in shallow grooves in the base plate, while in a similar way each of the permanent magnets 11, 12 has secured to its rear face a brass strip 38, 39 so that both the cross-limbs 6, 7 and the magnets 11, 12 can be caused to slide all in the same direction before being finally secured in position in the manner already described with reference to Figures 1 to 5. In this case, however, for accurate setting up, it is desirable to provide either four separate thin shims, or two shims each consisting of two parts inclined to one another.

It is clear that a movement such as illustrated in Figure 6 could be used for a high frequency relay or with a slight modification as the energising movement of a loud speaking telephone, in which case the vibrating armature 10 may be connected to the telephone diaphragm by any suitable connection between the square spindle 34 and the diaphragm.

Figure 7:
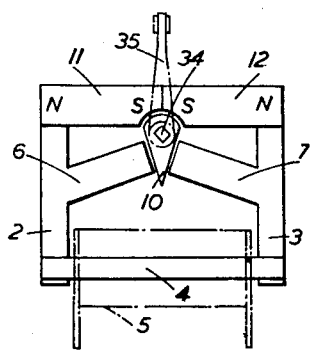
Figure 7 is a similar view showing a further modification with a somewhat different form of armature.

In Figure 7, a form of construction is shown on much the same lines as that shown in Figure 6 except that in this case the armature 10, as seen in side view, has the shape of a thin wedge with its base curved as an arc struck from the centre of the spindle 34. The arrangement of the contact tongue 35 and of the cross-limbs 6, 7 and the side limbs 2, 3 may be the same as in Figure 6, although the means for guiding them during assembly in grooves in a base plate are not shown. The magnets 11, 12, however, are in this case at right-angles to the side plates 2, 3 and can therefore slide directly in shallow grooves in a brass base plate. Their inner like poles are shown abutting and are machined to the shape of the curved surface of the armature 10, but clearly in order to allow latitude in the width of the air gap between them and the armature, as determined by the insertion of an arc-shaped shim, the magnets 11, 12 would barely come into contact when finally set up. Generally speaking, the form shown in Figure 7 operates in the same way as that shown in Figure 6, and the magnetic circuits of both of them are similar to those shown in Figure 5.

If a strictly triangular armature is employed, there must be sufficient clearance between the permanent magnets 11, 12 and the base of the armature to allow the latter to vibrate to the required extent.

In any of the forms of construction described, the reluctance of the magnetic circuits, including the field magnets 11, 12, may be increased by leaving gaps between the side limbs 2, 3 and the magnets 11, 12 or otherwise in order to reduce magnetic shunting of the lateral limbs 6, 7 with respect to the fluctuating flux.

In all three arrangements illustrated in Figures 5 to 7 inclusive the pivotal axis of the armature is located substantially at the point of juncture of the two polarizing flux paths from magnets 11 and 12. Due to the location of the pivotal axis and to the shape of the armature, vibration of the armature in all three arrangements does not materially change the reluctance of the two gaps between the armature and magnets 11 and 12.

I claim:

1. An electromagnetic device of the class set forth, comprising a magnetic structure including a magnetic circuit of low reluctance, a pair of pole-pieces in said magnetic circuit abutting on the effective air-gaps of the device, polarizing means for establishing the polarizing flux for the device, a coil linked with said magnetic circuit of low reluctance, and a vibratory armature pivoted at or near its centre of gravity to move to and from each of said pole-pieces and shaped with a varying section perpendicular to its neutral axis, said section being greater where the flux in said armature is greater.

2. An electromagnetic device of the class set forth, comprising a non-magnetic supporting plate, a magnetic structure mounted on one side thereof and including a pair of pole-pieces each with a face adjacent one of the effective air-gaps of the device, a magnetic bridge piece connecting said pole-pieces to form a magnetic circuit of low reluctance, a pair of magnet members co-operating with said pair of pole-pieces to form two magnetic circuits for a polarizing flux with two paths in parallel, the elements of said magnetic circuits being mounted so that the planes of all three magnetic circuits are arranged substantially parallel with the face of said supporting plate, a vibratory armature presenting faces each adjacent one of said effective air-gaps and mounted on the same side of said plate to co-operate with said magnet members, said two magnetic circuits presenting a path in parallel with said effective air-gaps having a reluctance large compared with that of said air-gaps, and one or more of the elements comprising said pole-pieces, said magnet members and said armature being mounted on said plate so as to be slidable for adjustment during assembly.

3. An electromagnetic device of the class set forth, comprising a vibratory armature and a magnetic structure including a pair of pole-pieces each presenting a face to said armature, a pair of magnet members co-operating with said pair of pole-pieces to form two magnetic circuits for a polarizing flux with two paths in parallel, and each magnet presenting a pole face directly to said armature, said armature being mounted so as to be slidable and rotatable relatively to said pole-pieces and said magnet members for adjustment during assembly.

4. An electromagnetic device comprising, in combination, a magnetic structure forming a magnetic circuit of low reluctance and having an air gap, a vibratory magnetic armature having a portion thereof positioned in said air-gap, magnetic structure forming a path of high reluctance bridging said air-gap and also having an air-gap in which another portion of said vibratory armature is positioned, said bridging path embodying means for establishing a polarizing flux in the portion of said armature lying between said air-gaps, said polarizing flux having one polarity in one air-gap and the opposite polarity in the other air-gap, and an actuating coil for establishing a flux in said magnetic circuit of low reluctance.

5. An electromagnetic device according to claim 4 wherein the air-gap of said bridging path is formed between like poles of a pair of permanent magnets included in said path on opposite sides of said armature.

6. An electromagnetic device according to claim 4 wherein said vibratory armature is pivoted for oscillation about an axis positioned within the air-gap of said bridging path.

7. An electromagnetic device according to claim 4 wherein said armature is pivotally mounted for oscillation about an axis located substantially at the point of juncture of the two polarizing flux paths from opposite poles of the air-gap in said bridging path.

8. An electromagnetic device according to claim 4 wherein said armature is provided with an arm extending beyond said bridging path, and including means pivotally mounting said armature substantially at the center of gravity of the vibratory mass.

9. An electromagnetic device according to claim 4 wherein said armature comprises a magnetic piece of rhombic shape and the pole faces of said air-gaps are arranged at angles to each other and parallel with the adjacent faces of said rhombic piece.

10. An electromagnetic device comprising, in combination, a non-magnetic supporting plate, a pair of magnetic pole pieces, means for locating and guiding said pole pieces on said supporting plate for adjustment towards and from each other to form an air-gap of variable width between said pieces, means for clamping said pole pieces to said plate in adjusted position, a magnetic bridge piece connecting said pole pieces to form a magnetic circuit of low reluctance, and an actuating coil linked with said bridge piece.

11. An electromagnetic device comprising, in combination, a non-magnetic supporting plate, a magnetic structure mounted on one side of said plate and forming a magnetic circuit including an air gap formed between a pair of pole pieces in said circuit, a magnetic vibratory armature mounted on said plate and having a portion thereof positioned in said air-gap, means for mounting at least one of said pole pieces for adjustment to and from said armature to vary the air-gap between said armature and said pole piece, and means for clamping said adjustable pole piece to said plate in adjusted position.

12. An electromagnetic device according to claim 4 and including a non-magnetic plate supporting said magnetic structure, and wherein the air-gaps in the low reluctance magnetic circuit and in the bridging path are both formed between pole pieces movable towards and away from said magnetic armature during assembly, and means for securing said pole pieces to said plate in adjusted position.

13. An electromagnetic device comprising, in combination, a non-magnetic supporting plate, a magnetic armature having a rhombic shape pivotally supported on said plate, a pair of permanent magnets supported on said plate so that one end face of each magnet is presented to one face of said rhombic shaped armature, a pair of magnetic pole pieces supported on said plate so that one end face of each pole piece is presented to one of the remaining faces of said armature, means including shallow grooves formed in the surface of said plate for mounting said magnets and said pole pieces for adjustment to and from said armature.

14. An electromagnetic device according to claim 3 wherein said vibratory armature is pivotally supported upon a base by a structure including integral arms extending on either side of said armature in the direction of its pivotal axis, a pair of blade springs supported on said base and extending into engagement with said arms, and means for adjustably securing said arms to said springs.

15. An electromagnetic device comprising, in combination, a supporting base, a magnetic structure mounted on said base and comprising a magnetic circuit having an air-gap therein, a magnetic armature positioned in said air-gap, and means for pivotally supporting said armature upon said base on an axis passing through said gap comprising integral arms extending in opposite directions from a portion of said armature located within said gap, a pair of blade springs supported on said base, and means for clamping said arms to said springs whereby said springs serve to position said armature centrally of said gap.

16. A polarized electro-magnetic relay comprising an energizing coil having a magnetic core, an elongated vibratory magnetic armature mounted adjacent said coil and having its longitudinal axis directed substantially through the axis of said core, a magnetic circuit of low reluctance formed between the ends of said core and including a pair of spaced pole pieces mounted on opposite sides of the end of the armature nearest said coil, a magnetic path of relatively high reluctance completed between the ends of said core and including a pair of magnets having like poles thereof arranged on opposite sides of said armature adjacent the pivotal axis thereof, a contact arm carried by said armature and extending to the opposite side of its pivotal axis from said coil, and stationary contacts cooperating with said contact arm, said elements being arranged so that the centers of said contacts, the center lines of said pole pieces, the center lines of said magnets, and the axis of said core are all positioned substantially in the same plane.

RUPERT EVAN HOWARD CARPENTER.